(12) United States Patent
Jarvela

(10) Patent No.: US 8,449,170 B1
(45) Date of Patent: May 28, 2013

(54) DRY PARTICULATE AERATOR FOR SMALL DIAMETER APPLICATIONS

(75) Inventor: Gregory W. Jarvela, Isanti, MN (US)

(73) Assignee: Webb Tech Group, LLC, Fridley, MN (US)

( * ) Notice: Subject to any disclaimer, the term of this patent is extended or adjusted under 35 U.S.C. 154(b) by 783 days.

(21) Appl. No.: 12/547,010

(22) Filed: Aug. 25, 2009

Related U.S. Application Data

(60) Provisional application No. 61/091,916, filed on Aug. 26, 2008.

(51) Int. Cl.
- *B01F 13/02* (2006.01)
- *B65D 88/70* (2006.01)
- *B65G 53/22* (2006.01)

(52) U.S. Cl.
CPC ............ *B65D 88/706* (2013.01); *B65G 53/22* (2013.01); *B01F 13/0255* (2013.01)
USPC .......................................... 366/101; 222/195

(58) Field of Classification Search
CPC .............................. B65G 53/22; B65D 88/706
USPC ........... 366/101, 106, 107; 222/195; 34/585, 34/582
See application file for complete search history.

(56) References Cited

U.S. PATENT DOCUMENTS

| | | | | | |
|---|---|---|---|---|---|
| 3,754,740 | A | * | 8/1973 | Piper | 261/124 |
| 3,929,261 | A | * | 12/1975 | Solimar | 222/195 |
| 3,952,956 | A | * | 4/1976 | Steele | 239/289 |
| 4,172,539 | A | * | 10/1979 | Botkin | 222/195 |
| 4,534,653 | A | * | 8/1985 | Courtay | 366/106 |
| 4,662,543 | A | * | 5/1987 | Solimar | 222/195 |
| 4,820,052 | A | * | 4/1989 | Krysel | 366/101 |
| 5,139,175 | A | * | 8/1992 | Krysel et al. | 222/195 |
| 5,381,606 | A | * | 1/1995 | Solimar | 34/585 |
| 5,564,825 | A | * | 10/1996 | Burt | 366/175.2 |
| 5,988,867 | A | | 11/1999 | Sisk | |
| 6,170,976 | B1 | | 1/2001 | Sisk | |

OTHER PUBLICATIONS

Solimar Silo Fluidizer User Guide, Aug. 2008, Solimar Pneumatics, Minneapolis, MN.

* cited by examiner

*Primary Examiner* — Tony G Soohoo
(74) *Attorney, Agent, or Firm* — Moore & Hansen, PLLC

(57) ABSTRACT

An aerator for assisting in the discharge or transport of dry bulk particulate materials in applications in which the aerator must be mounted to a surface of small diameter, such as a duct, hopper, or tank. The aerator unexpectedly performs more efficiently than would be expected from simply reducing the proportions of an otherwise similar aerator designed for larger diameter applications.

9 Claims, 2 Drawing Sheets

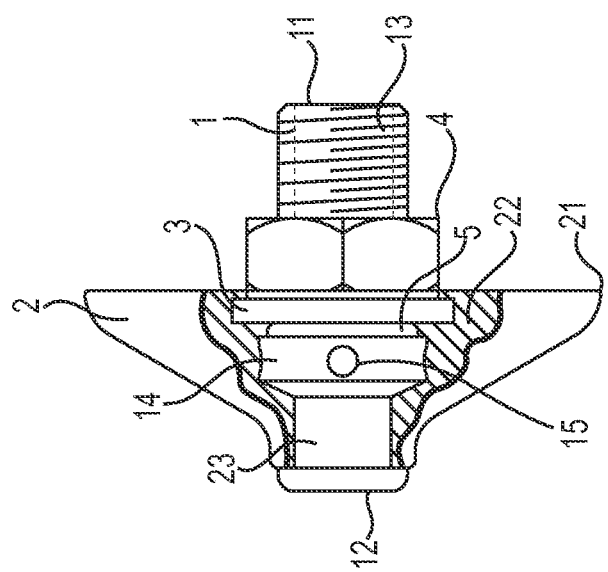
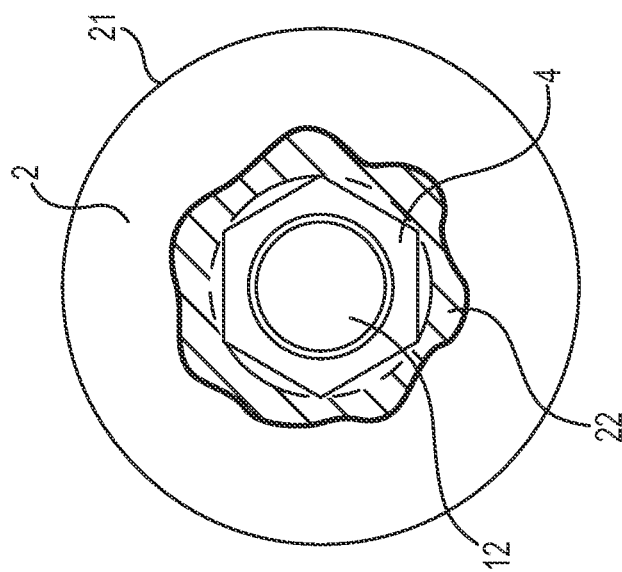
Fig. 1B
Fig. 1A

DRY PARTICULATE AERATOR FOR SMALL DIAMETER APPLICATIONS

CROSS-REFERENCE TO RELATED APPLICATION

This application claims the benefit of U.S. Provisional Application No. 61/091,916 filed Aug. 26, 2008.

TECHNICAL FIELD

This application concerns an apparatus for aeration of the type disclosed in U.S. Pat. No. 4,662,543 (Solimar).

BACKGROUND

Air or other pressurized gas is commonly introduced into dry bulk material to fluidize the material for efficient pneumatic transfer through vessels such as ducts, hoppers, tanks, bins, silos, bulk carrier dischargers, and the like. Because the materials are being transported in bulk, and are prone to bind or pack against non-smooth surfaces, such vessels are characterized by smooth curved surfaces, i.e., circular cross-sections having large diameters. To be effective, aerators must not only introduce the air or other gas into the vessel, but must do so while introducing a degree of vibration to the vessel and material, along with a dispersion of the air supply into the vessel.

One popular type of aerator is taught in U.S. Pat. No. 4,662,543 (Solimar). It comprises a resilient flexible disk having an inner conical surface and an outer conical surface. The disk is mounted on a hollow stem having air outlets underneath the disk, such that the aerator may be fastened to a hole in the surface of the vessel to place the disk in a prestressed condition against the inner, curved surface of the vessel. Pressurized gas flows through the hollow stem through the air outlets to the interior of the vessel, beneath the disk, and then outwardly past the interface between the edge of the disk and the inner curved surface of the vessel. This causes the edge of the disk to vibrate as the gas passes by.

There is, therefore, an interrelationship between the resiliency and flexibility of the disk, the diameter of the vessel surface, and the gas pressure, that dictate whether an aerator is effective for its intended purpose.

SUMMARY

An aerator for assisting in the discharge or transport of dry bulk particulate materials is particularly adapted for applications in which the aerator must be mounted to a surface having small diameter (or radius), such a duct, hopper, or tank. The aerator unexpectedly performs more efficiently than would be expected from simply reducing the proportions of an otherwise similar aerator designed for larger diameter applications.

Specifically, the aerator may comprise a hollow stem (having proximal and distal ends, an inner volume and an outer surface) and a plurality of gas discharge ports at the distal end of the stem for connecting the inner volume with the outer surface; a flexible, resilient disk having a perimeter edge and a concave shape defining a volume within the perimeter edge of the disk; and means for mounting the stem through the hole in the vessel wall such that the flexibility of the perimeter edge of the disk provides a resilient seal within the volume adjacent the hole in the vessel wall. The disk is mounted to the stem distally beyond the plurality of gas discharge ports. The disk has having diameter in the range of about 1.9 inches to 2.1 inches, most preferably 2.0 inches.

Such aerators are optimally suited for combinations in which the aerator is mounted on a vessel having an inner diameter of less than sixteen inches as measured where the aerator is mounted to form the combination. Such vessels include ducts, hoppers, and tanks of relatively small diameter.

BRIEF DESCRIPTION OF THE FIGURES

The accompanying figures show a particular preferred embodiment as an example, but such illustration is not intended to limit the scope of the claims. In particular, the proportions and/or dimensions that may be shown in, or suggested by, the figures are preferred but not required except as specifically set forth in the claims.

FIG. 1 is a set of side cross-section and top views of a preferred embodiment.

DETAILED DESCRIPTION

Figure 2:
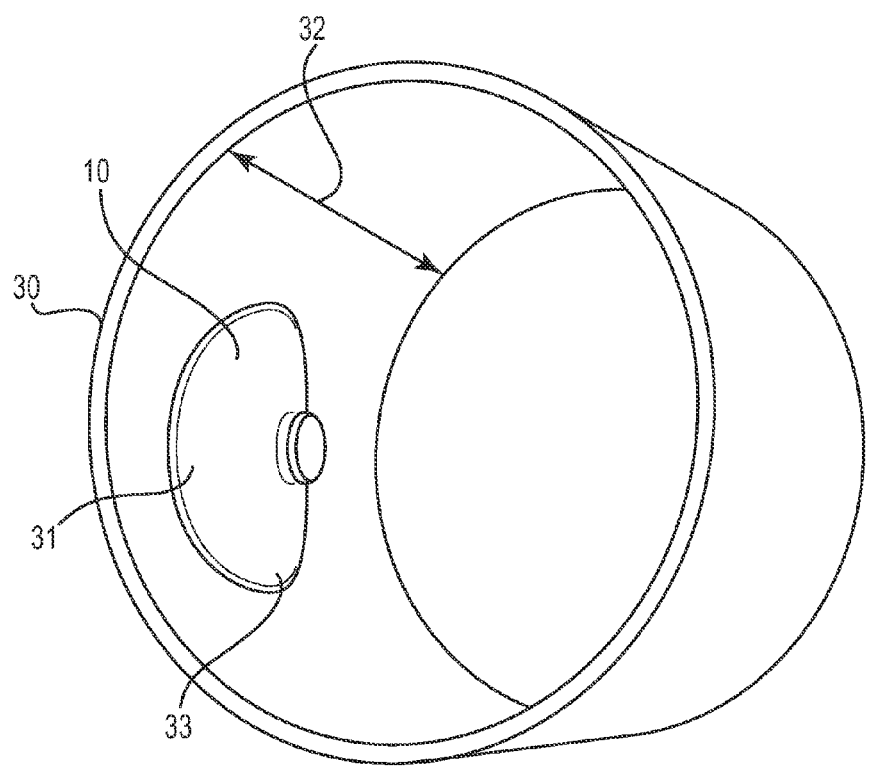
FIGS. 2 and 3 are perspective and end views, respectively, of the preferred embodiment of FIG. 1 mounted to a portion of a vessel.

In general terms, the claims define an aerator operating in much the same manner as that taught in U.S. Pat. Nos. 4,662,543 and 5,381,606, the entire contents of each of which is incorporated by reference for purposes of establishing vocabulary and environment that serve as background information.

OVERVIEW

The following description necessarily relies on a particular preferred embodiment only as an example. Accordingly, specific reference to structures for performing a function should also be understood as being intended to disclose performance of the function per se by the same or equivalent structures. The full scope of such functions is defined by claims to methods that appear at the conclusion of this application.

FIG. 1 is a set of side cross-section and top views of a preferred embodiment of aerator 10, which comprises stem 1, disk 2, washer 3, nut 4, and O-ring 5. These components are assembled to function together as generally described in U.S. Pat. No. 4,662,543 and U.S. Pat. No. 5,381,606 except for those differences which would be apparent from this application and specifically except for those differences reflected in the limitations of the claims which conclude this application.

In general terms, aerator 10 is designed to be mounted through a hole in a vessel wall. The hollow stem 1 has proximal and distal ends 11 and 12, respectively. The hollow nature of stem 1 is reflected by an inner volume 13. Stem 1 also has an outer surface 14, and a plurality of gas discharge ports 15 at the distal end 12 of the stem 1, for connecting the inner volume 13 with the outer surface 14 and thus permitting gas to pass from the former to the volume 22 surrounding the latter.

The flexible, resilient disk 2 has a perimeter edge 21 and a concave shape which partially defines the volume 22 within the perimeter edge 21 of the disk 2. The disk 2 is mounted to the distal end 12 of stem 1 in any convenient manner, such as being placed around a neck 23 that lies distally beyond the plurality of gas discharge ports 15.

It is required that the disk be substantially circular. Aerator 10 is sized for application to vessels which are less than sixteen inches in diameter. Commercial embodiments of the inventions taught and claimed in the two patents cited above cannot adequately function in such settings if their disks are substantially circular, i.e., they lack removal of two "sides" in the form of approximately one-half inch wide "D" shaped portions. Aerator 10 does not require any removal of any portion of disk 2, and thus disk 2 remains substantially circular.

It is preferred that the disk is generally conical, formed of flexible resilient material, and has an inner conical surface and an axially aligned outer conical surface. It is independently preferred that the disk have an outer periphery shaped to direct a flow of material away from a seam defined by a juncture of the base end and the inside surface of the vessel wall. It is also independently preferred that the outer conical surface of the disk and the inner conical surface be joined at the outer periphery of the disk by a surface extending away from the seam and toward an axis of the conical surfaces.

The aerator 10 employs any convenient means for mounting the hollow stem 1 through the hole in the vessel wall, such that the flexibility of the perimeter edge 21 of the disk 2 provides a resilient seal within the volume adjacent the hole in the vessel wall. In the preferred embodiment illustrated, the aerator 1 is positioned within the vessel, the vessel wall located between O-ring 5 and washer 3, such that nut 4 (or any other threaded fastener) may be tightened against the outer surface of the vessel wall to hold aerator 10 in place within the vessel. This places the inlet into inner volume 13 (located at proximal end 11) outside the vessel where it may be connected to a source of pressurized gas. The gas flows though inner volume 13 and discharges out each gas discharge port 15 within volume 22 and causes peripheral edge 21 of disk 2 to vibrate as the gas passes into the vessel and fluidizes the bulk material.

As specifically illustrated in FIG. 1, disk 2 has an outer diameter in the range of about 1.9 to about 2.1 inches, most preferably 2.0 inches. This compares to the diameter of 4.0 inches in commercial embodiments of those same two U.S. patents. The latter commercial products are available from Solimar Pneumatics of Minneapolis, Minn. USA.

Preferred, but not required, materials for the components of aerator 10 are: type 303 stainless steel for stem 1; silicone for disk 2; type 18-8 stainless steel for each of washer 3 and nut 4; and FDA-approved nitrile for O-ring 5.

Figure 3:
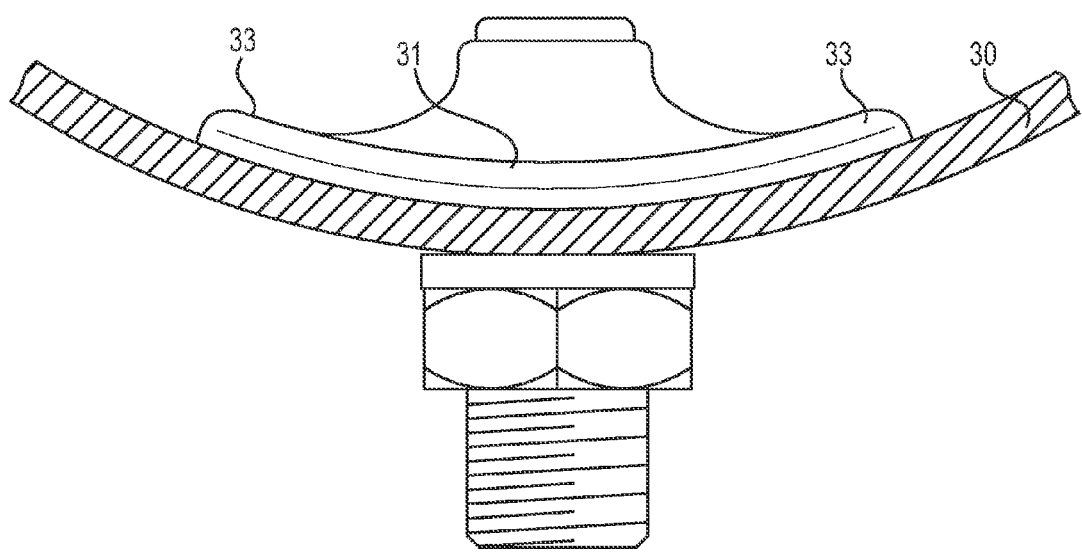

FIGS. 2 and 3 illustrate the preferred embodiment of aerator 10 mounted to a portion of a vessel 30. As illustrated, disk 2 has a diameter of 2.0 inches and vessel 30 has an inner diameter of 4.0 inches. Mounting aerator 10 to vessel 30 exploits the flexibility of disk 2, such that disk 2 deforms into the saddle shape illustrated. That is, two diametrically opposed portions 31 of disk 2 that lie generally transverse to the longitudinal axis 32 of vessel 30 deform toward distal end 12 of aerator 10, or in other words toward the interior center of vessel 30. Along the longitudinal axis 32, two other diametrically opposed portions 33 of disk 2 deform as required to conform to the interior shape of vessel 30 generally along the longitudinal axis 32 of vessel 30. All points along the perimeter edge 22 of disk 2 generally match the curvature of the interior surface of vessel 30 in their immediate vicinity. The result is that the perimeter edge 22 conforms to the interior surface of vessel 30, despite the small diameter (radius) of vessel 30.

EXAMPLE

A version of a design according to the principles of this application ("Mini Fluidizer") was compared to a design having a standard size disk ("Standard Fluidizer"). The two designs differed from each other primarily by a strict one-half ratio in size of all components for the smaller design according to this application compared to the commercially available aerator.

The test involves mounting each fluidizer to a flat plate that represents the wall of a vessel. The vicinity surrounding the disk is dusted with a layer of bulk particulate material. Pressurized air is pulsed into the inner volume of each fluidizer as in normal operation. The pulse sequence was three pulses of air at one second duration per pulse, with each pulse separated by intervals without pulsed air of one second each. The independent variables in the test are the size of the fluidizer disk and the pressure of the air bursts. The test measures the maximum and minimum sizes of patterns of dispersed material, i.e., the pattern of the surface from which material has been dispersed away by the action of the air bursts and the operation of the fluidizer.

Despite the circular shape of the disk of the aerator, the patterns were irregularly shaped, and thus a composite or "average diameter" required two such measurements. The measurements were then used to calculate the area of the surface on the basis of two assumptions: first, that the pattern was rectangular [area=maximum×minimum]; and, second, that the pattern was circular [area=$(\pi/4)$×diameter$^2$].

First, the commercially available large aerator ("Standard Fluidizer" or "Regular Fluidizer") was tested and the following data obtained.

TABLE 1

|  | 15 PSI* | | 20 PSI* | | 30 PSI* | | 40 PSI* | |
|---|---|---|---|---|---|---|---|---|
| Test # | Min | Max | Min | Max | Min | Max | Min | Max |
| 1 | 9 | 11 | 7 | 14 | 9 | 16 | 11 | 16 |
| 2 | 7 | 11 | 7 | 14 | 10 | 13 | 12 | 18 |
| 3 | 7 | 11 | 7 | 15 | 9 | 15 | 12 | 17 |
| 4 | 8 | 10 | 8 | 14 | 9 | 15 | 11 | 16 |
| 5 | 7 | 11 | 7 | 14 | 9 | 13 | 12 | 17 |
| Average | 7.6 | 10.8 | 7.2 | 14.2 | 9.2 | 14.4 | 11.6 | 16.8 |
| ED[1] | 9.2 | | 10.7 | | 11.8 | | 14.2 | |
| AER[2] | 82.08 | | 102.24 | | 132.48 | | 194.88 | |
| AEC[3] | 66.4 | | 89.9 | | 109.3 | | 158.3 | |

[1]Effective Diameter (inch)
[2]Effective Area (square inch) calculated as rectangular region using Average Max and Average Min
[3]Effective Area (square inch) calculated as circular region using Effective Diameter

[1]Effective Diameter (inch)
[2]Effective Area (square inch) calculated as rectangular region using Average Max and Average Min
[3]Effective Area (square inch) calculated as circular region using Effective Diameter The asterisk indicates three (3) bursts of air were employed.

It was observed that increased air pressures tended to produce an elongated pattern which had diminished definition.

Next, a "Mini Fluidizer" embodiment according to this application and claims was tested, and the following data were obtained.

TABLE 2

|  | 15 PSI* | | 20 PSI* | | 30 PSI* | | 40 PSI* | |
|---|---|---|---|---|---|---|---|---|
| Test # | Min | Max | Min | Max | Min | Max | Min | Max |
| 1 | 6 | 7 | 7 | 7.5 | 8 | 10 | 12 | 13 |
| 2 | 6 | 6.5 | 7 | 8 | 10 | 10 | 12 | 14 |
| 3 | 6 | 6 | 7 | 8.5 | 8 | 10 | 12 | 12 |
| 4 | 6 | 7 | 7 | 8 | 9 | 10 | 12 | 13 |
| 5 | 6 | 6.5 | 7 | 7.5 | 9 | 10 | 12 | 13 |

TABLE 2-continued

| Test # | 15 PSI* | | 20 PSI* | | 30 PSI* | | 40 PSI* | |
|---|---|---|---|---|---|---|---|---|
| | Min | Max | Min | Max | Min | Max | Min | Max |
| Average | 6 | 6.6 | 7 | 7.9 | 8.8 | 10 | 12 | 13 |
| ED | 6.3 | | 7.45 | | 9.4 | | 12.5 | |
| AER | 39.6 | | 55.3 | | 88 | | 156 | |
| AEC | 31.2 | | 43.6 | | 69.4 | | 122.7 | |

The asterisk indicates three (3) bursts of air were employed.

It was observed that increased air pressures tended to produce four-pointed "star" patterns which were less generally circular than the patterns produced at lower pressures.

The comparison of the performance of the Mini Fluidizer compared to the Standard Fluidizer is expressed by the Performance Ratio at a given air pressure setting. The Performance Ratio of one fluidizer compared to another is defined as the ratio of the Effective Area of that fluidizer compared to the Effective Area of the others. The Effective Areas are rectangular regions determined using Average Max and Average Min measurements of displaced material determined for a series of tests under otherwise identical conditions (e.g., constant air pressure, number of air bursts employed per measurement, number of measurements performed). Or the Effective Areas may be circular regions using Effective Diameter measurements for a series of tests under otherwise identical conditions. The same geometry (rectangular or circular) is used for each fluidizer. Average Max, Average Min, and Effective Diameter are calculated as illustrated above or according to any other reasonably representative measurement of the pattern area used consistently in the comparison.

A Performance Ratio of 50% is expected for a Mini Fluidizer that is one-half the scale of a similarly designed Regular Fluidizer. It is also expected that the Performance Ratio will not vary with air pressure value. The results appear below.

TABLE 3

| Ratio Based On | 15 PSI | 20 PSI | 30 PSI | 40 PSI |
|---|---|---|---|---|
| AER | 48.2% | 54.1% | 66.4% | 80.0% |
| AEC | 46.9% | 48.5% | 63.5% | 77.5% |

The test results unexpectedly failed to confirm both criteria. The Mini Fluidizer performed more effectively (Performance Ratio greater than 50%) at higher pressures (above 15 PSI). This was wholly unexpected because the ratio of sizes of the smaller aerator to the larger aerator is one-half and the performance of the aerator is expected to be strictly linear with aerator size. Also wholly unexpected was the result that the value of the Performance Ratio increased with increasing air pressure, so much so that essentially equivalent performance (Performance Ratio greater than about 90%) was achieved at pressures of 30 PSI and greater.

The results of the Example demonstrate an unexpected result: the smaller design was characterized by an amount of effective area such that the Performance Ratio was greater than the 50% value that was expected based on previously known design principles and the sizes of the components of each design. In many cases (i.e., at 30 PSI or greater), the unexpected result was quite significant, i.e., a Performance Ratio of 60% or greater.

Without wishing to be bound by theory, it is believed that this unexpected performance is also being accomplished by using a significantly lower amount (volume) of compressed air. This lower consumption in turn reduces the cost of producing the air.

References to the "diameter" of the disk should be understood as referring to the actual circular diameter or the effective diameter of any perimeter associated with a non-circular disk. Thus, the effective diameter employed in the Example above is only one example of a method for calculating the diameter of the disk. Other methods may employ multiple measurements and calculations such as the algebraic mean, the geometric mean, the median, and so on.

Aerators according to the principles disclosed here are optimally suited for combinations in which the aerator is mounted on a vessel having an inner diameter of as little as 4.0 inches, measured where the aerator is mounted to form the combination.

I claim:

1. An aerator for mounting through a hole in a vessel wall, comprising: a hollow stem having proximal and distal ends, an inner volume and an outer conical surface, a plurality of gas discharge ports at the distal end of the stem for connecting the inner volume with the outer conical surface; a substantially circular, flexible, resilient disk having a perimeter edge and a concave shape defining a volume within the perimeter edge of the disk, the disk being mounted to the stem distally beyond the plurality of gas discharge ports; and means for mounting the stem through the hole in the vessel wall such that the flexibility of the perimeter edge of the disk provides a resilient seal within the volume adjacent the hole in the vessel wall; in which the disk has an outer diameter in the range of about 1.9 inches to 2.1 inches.

2. The aerator of claim 1, in which the disk is generally conical, formed of flexible resilient material, and has an inner conical surface and an axially aligned outer conical surface.

3. The aerator of claim 1, in which the disk has an outer periphery shaped to direct a flow of material away from a seam defined by a juncture of a base end and the inside surface of the vessel wall.

4. The aerator of claim 1, further comprising an inner conical surface; in which the outer conical surface of the disk and the inner conical surface are joined at the outer periphery of the disk by a surface extending away from the seam and toward an axis of the inner and outer conical surfaces.

5. The combination of claim 1, in which the disk is generally conical, formed of flexible resilient material, and has an inner conical surface and an axially aligned outer conical surface.

6. An aerator mounted in an interior of a vessel having an inner diameter of than sixteen inches as measured where the aerator is mounted; in which the aerator comprises: a hollow stem having proximal and distal ends, an inner volume and an outer surface, a plurality of gas discharge ports at the distal end of the stem for connecting the inner volume with the outer surface; a substantially circular, flexible, resilient disk having a perimeter edge and a concave shape defining a volume within the perimeter edge of the disk, the disk being mounted to the stem distally beyond the plurality of gas discharge ports; and means for mounting the stem through the hole in the vessel wall such that the flexibility of the perimeter edge of the disk provides a resilient seal within the volume adjacent the hole in the vessel wall; in which the disk has an outer perimeter in the range of about 1.9 inches to 2.1 inches.

7. A combination aerator and vessel, the combination comprising:
a vessel having a wall; and
an aerator for mounting through the hole in a vessel wall, the aerator including:

a hollow stem having proximal and distal ends, an inner volume and an outer conical surface, a plurality of gas discharge ports at the distal end of the stem for connecting the inner volume with the outer conical surface; a substantially circular, flexible, resilient disk having a perimeter edge and a concave shape defining a volume within the perimeter edge of the disk, the disk being mounted to the stem distally beyond the plurality of gas discharge ports; and means for mounting the stem through the hole in the vessel wall such that the flexibility of the perimeter edge of the disk provides a resilient seal within the volume adjacent the hole in the vessel wall; in which the disk has an outer diameter in the range of about 1.9 inches to 2.1 inches;

wherein the vessel has an inner diameter of less than sixteen inches as measured where the aerator is mounted.

8. The combination aerator and vessel of claim 7, in which the disk has an outer periphery shaped to direct a flow of material away from a seam defined by a juncture of a base end and the inside surface of the vessel wall.

9. The combination aerator and vessel of claim 7, further comprising an inner conical surface; in which the outer conical surface of the disk and the inner conical surface are joined at the outer periphery of the disk by a surface extending away from the seam and toward an axis of the inner and outer conical surfaces.

* * * * *